INVENTOR.
EDGAR A. SWIFT
BY
A. J. Steger
E. J. Holler

March 17, 1970 E. A. SWIFT 3,500,997

TELEPHONE PACKAGE

Filed Nov. 1, 1968 3 Sheets-Sheet 2

INVENTOR.
EDGAR A. SWIFT
BY
A. J. Steger
& E. J. Holler

TELEPHONE PACKAGE

Filed Nov. 1, 1968 3 Sheets-Sheet 3

INVENTOR.
EDGAR A. SWIFT
BY A. J. Steger & E. J. Holler 3,500,997
Patented Mar. 17, 1970

3,500,997

TELEPHONE PACKAGE

Edgar A. Swift, Paxton, Mass., assignor to Owens-Illinois, Inc., a corporation of Ohio Filed Nov. 1, 1968, Ser. No. 772,692
Int. Cl. B65d 77/26, 81/02, 85/30
U.S. Cl. 206—46 8 Claims

ABSTRACT OF THE DISCLOSURE

A telephone package which is adapted to hold several different styles of handset telephones and is formed from a single, folded, corrugated, fiberboard blank which includes top flaps that are foldable to lock or brace a telephone base within the package and simultaneously cradle a handset above the base.

Background of the invention

There are presently available a variety of different styles of handset telephones, such as the desk set, key set, and wall set. Because of the varying configurations of these telephones, it has been necessary to utilize a different package configuration to contain each style of telephone. The necessity for a separate package for each style of telephone has resulted in considerable time and expense for telephone manufacturers. Thus, there has been a great need for a simple and economical telephone package which is adapted to securely contain several different telephone configurations.

Summary of the invention

Therefore, it is an object of this invention to provide a simple and economical package for holding and shipping the aforementioned different styles of telephones wherein the base and handset are securely held in position relative to each other and relative to the package in such a way that damage to the telephone is substantially eliminated.

In accordance with the above object, the present invention contemplates a telephone package which is adapted to alternatively contain several different telephone configurations and which is formed from a single folded sheet of corrugated fiberboard and which includes a pair of top flaps which are foldable to lock or brace the telephone base in the package and simultaneously cradle the handset above the base.

Other objects, features, and advantages of the subject invention will become apparent to those skilled in the art upon reference to the following detailed description and the drawings illustrating the preferred embodiments thereof.

In the drawings

Description of the preferred embodiment

Figures 1, 2:
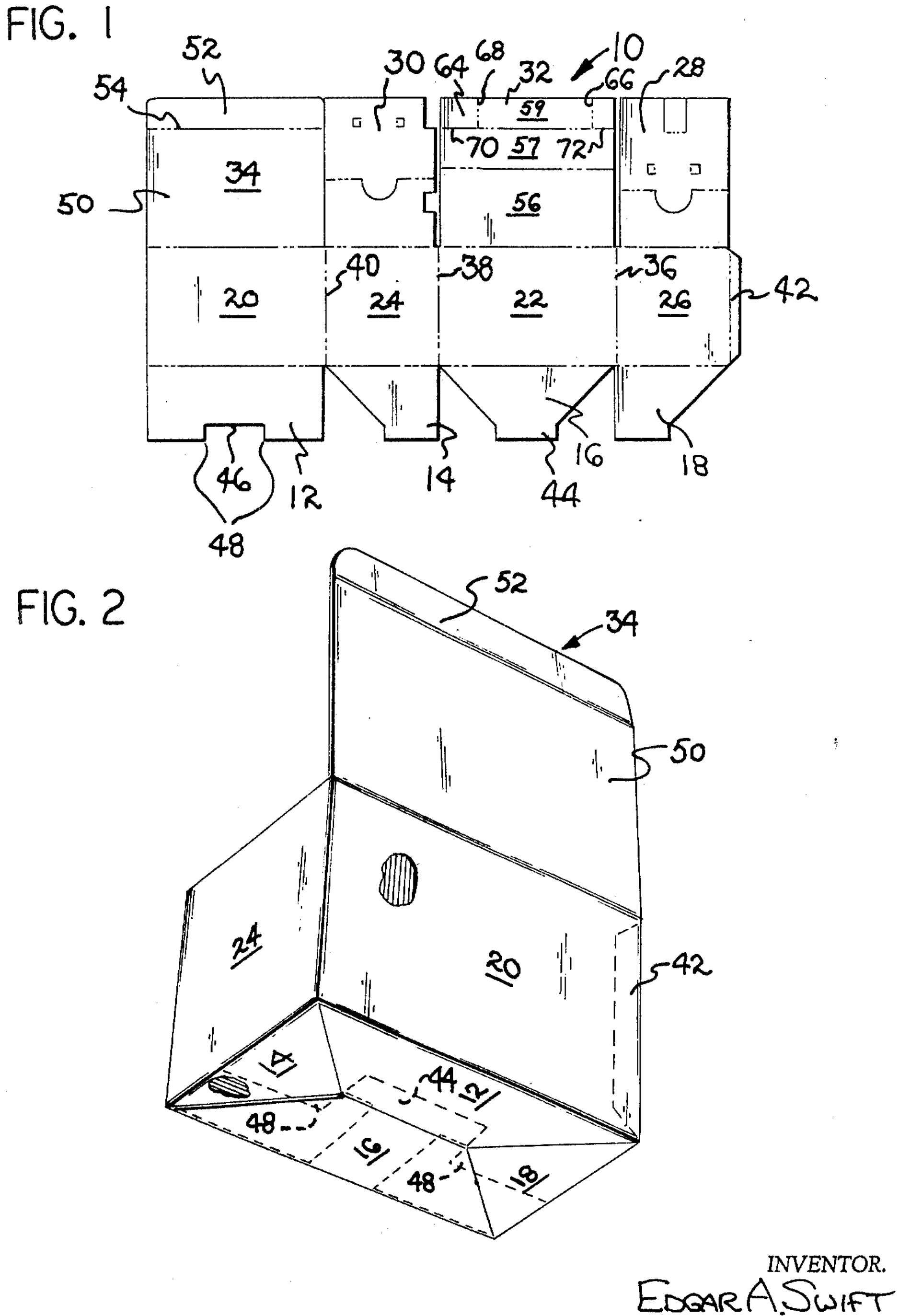
FIG. 1 is a top plan view of the fiberboard blank used to form the container of this invention.
FIG. 2 is a perspective view showing the container of this invention in its first assembly state.

In its preferred embodiment the container of this invention is formed from a single fiberboard blank 10 as is shown in FIG. 1. Cellulosic materials adapted for use in the fiberboard blank 10 of this invention include wood cellulose and pulps derived from hardwoods, softwoods, and woody annual plants such as balsam fir, Eastern hemlock, jack pine, Eastern white pine, red pine, black spruce, red spruce, white spruce, tamarack, cyprus, quaking aspen, American beech, paper birch, yellow birch, Eastern cottonwood, sugar maple, silver maple, yellow poplar, black cherry, white oak, bagasse, hemp, cotton and jute; mixtures of cellulosic materials can also be used.

The blank 10 is formed so as to include four interlocking bottom flaps 12 through 18, two side panels 20 and 22, two end panels 24 and 26, a pair of handset supporting flaps 28 and 30, a front insert flap 32, and a top closing panel 34.

To initially assemble the subject container, the box blank 10 is folded on score lines 36, 38 and 40 so that an assembly tab 42 on end panel 26 is positioned adjacent to the interior of side panel 20. This assembly tab 42 is glued or otherwise affixed to the interior of side panel 20 as shown in FIG. 2 forming what is termed a "manufacturer's joint."

To form the bottom portion of the subject container, the four interlocking bottom flaps 12 through 18 are folded as shown in FIG. 2. Interlocking flaps 14 and 18 are first folded inwardly and then interlocking flaps 12 and 16 are also folded inwardly so that a tongue 44 on interlocking flap 16 is slid into a rectangular slot 46 on the flap 12 and locked thereunder while at the same time corners 48 on flap 12 are locked under the flap 16.

Figure 3:
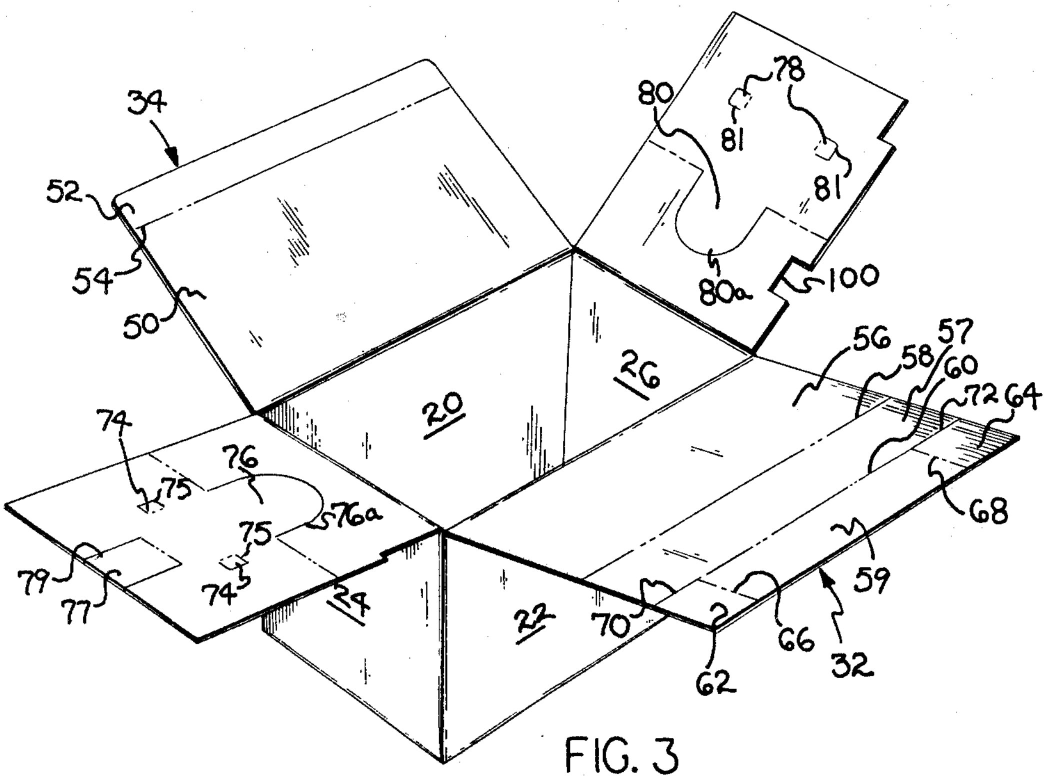
FIG. 3 is another perspective view of the container of this invention prior to the reception of a telephone.

As can best be seen in FIG. 3, the top closing panel 34 includes a main body portion 50 which forms the top of the container when closed and a tuck flap 52. This tuck flap 52 is joined to the top portion 50 along score line 54 and can be inserted into the container to hold the top portion 50 in closed relation to the box.

The front insert flap 32, as can best be seen in FIGS. 1 and 3, includes three panels 56, 57, and 59 separated by score lines 58 and 60. A pair of tabs 62 and 64 are hinged to the panel 59 along the score lines 66 and 68, respectively, but are separated from panel 57 along cut lines 70 and 72.

The left handset supporting flap 28 includes a pair of small hinged cutouts 74 which are adapted to pivot upwardly leaving openings 75 to snap over the rear stops of a telephone handset cradle and a large hinged cutout 77 adapted to pivot downwardly leaving a slot 79 to cradle the central portion of a telephone handset. Similarly, the right handset supporting flap 36 contains a pair of small hinged cutouts 78 which are adapted to pivot upwardly leaving openings 81 to snap over the front stops on the telephone handset cradle and a large slot 100 through which the handset cord can pass when the telephone is positioned within the container. Each of the handset supporting flaps 28 and 30 includes arcuate hinged cutouts 76 and 80, respectively, which are pivotable to form openings 76*a* and 80*a*, respectively, to receive the circular transmitting and receiving ends of a telephone handset.

To understand the positioning of the front closing flap 32 and the handset supporting flaps 28 and 30, when the subject container is utilized to house different types of telephones, reference may be had to FIGS. 4 through 9.

Figure 4:
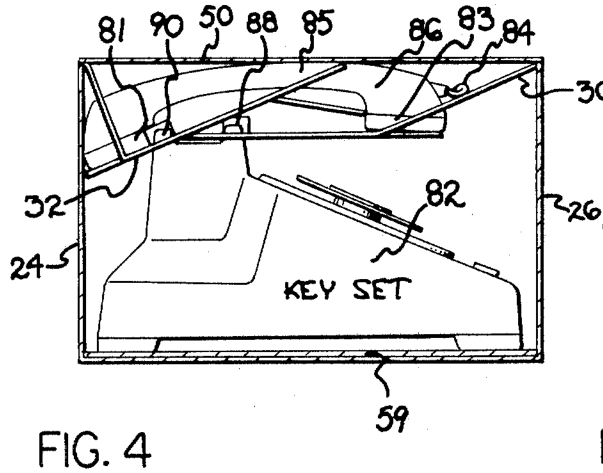
FIG. 4 is a front sectional view showing the subject container formed to package a key set telephone.
Figure 5:
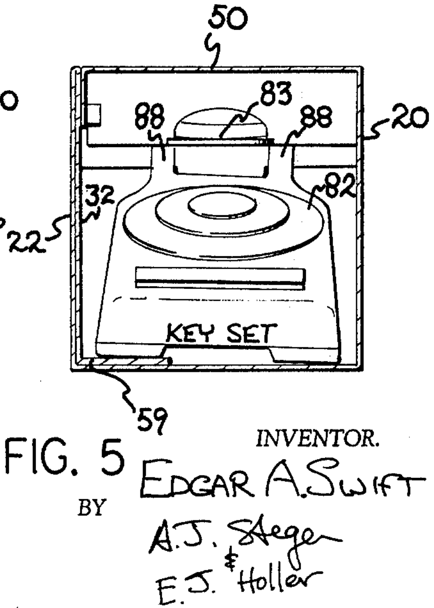
FIG. 5 is an end sectional view of FIG. 4 illustrating the fold of the front insert flap.

More specifically, FIGS. 4 and 5 show the subject conainer as utilized to package a key set telephone. The insert flap 32 is folded into the interior of the container so that panels 56 and 57 are flat against the front panel 22 and panel 59 flat against the bottom of the container. The tabs 62 and 64 remain in the same plane as flap 59 and pressed flat against the bottom of the container. The key set telephone base 82 is then placed into the container with its line cord (not shown) wrapped around the key set base 82. The handset portion 86 is left out of the box at this time. The right handset supporting flap 30 is folded into the container such that the pair of openings 81 formed by hinged cutouts 78 are snapped onto the front stops 88 of the key set base 82. Simultaneously, the coiled handset cord 84 is positioned so that it passes through slot 100 in flap 30 while the handset 86 still remains outside of the container. The left handset supporting flap 28 is then folded into the container and the pair of small openings 75 formed by hinged cutouts 74 are snapped onto the rear stops 90 of the key set base 82. The handset 86 is then positioned with respect to the handset flaps 28 and 30 such that the two circular ends 81 and 83 of the handset 86 reside within the large arcuate openings 76*a* and 80*a* formed by hinged cutouts 76 and 80, respectively, and the central holding portion 85 of the handset 86 resides within the slot 79 formed by hinged cutout 77. The top closing panel 34 is then folded over so that the tuck flap 52 is slid into the container between the front insert flap 32 and the edges of the handset supporting flaps 28 and 30. The main body portion 50 of the closing tuck flap 34 then becomes the top portion of the closed container.

Figures 6, 7:
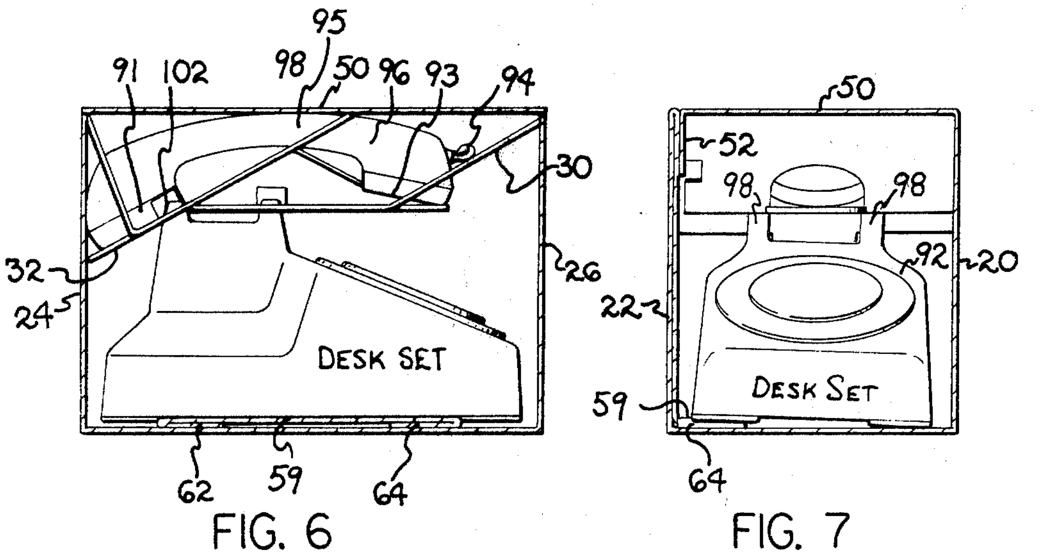
FIG. 6 is a front sectional view of the subject container formed to package a desk set telephone.
FIG. 7 is an end sectional view of FIG. 6 illustrating the fold at the front insert flap.

FIGS. 6 and 7 pictorially depict the subject container as utilized to package a desk set telephone. Initially, the front insert flap 32 is folded into the box with the hinged tabs 62 and 64 folded under panel 59 so that panels 56 and 57 are positioned flush against the front panel 22 and panel 59 against the bottom of the container. The desk set base 92 is then placed in the box and securely positioned over the panel 59 of front insert flap 32 which is raised by the underfolded tabs 62 and 64. The line cord (not shown) is wrapped around the desk set base 92 and the handset 96 temporarily left out of the container. The right handset supporting flap 30 is folded into the container and positioned so that the pair of openings 81 formed byt controls 78 snap over the front steps 98 on the desk set base 92. Simultaneously, the coiled handset cord 94 is positioned so that it passes through slot 100 at the edge of flap 32 while the handset 96 is out of the container. The left handset supporting flap 28 is then folded into the container and positioned with its pair of openings 75 formed by hinged cutouts 74 snapped over the rear stops 102 of the key set base 92. The handset 96 is then positioned so that its circular ends 91 and 93 reside within the large arculate openings 76*a* and 80*a* formed by hinged cutouts 76 and 80, respectively, and the central holding portion 95 of handset 96 resides within slot 79 formed by hinged cutout 77. The top closing panel 34 is then closed as in the FIGS. 4 and 5 embodiment to thereby complete the package.

Figure 8:
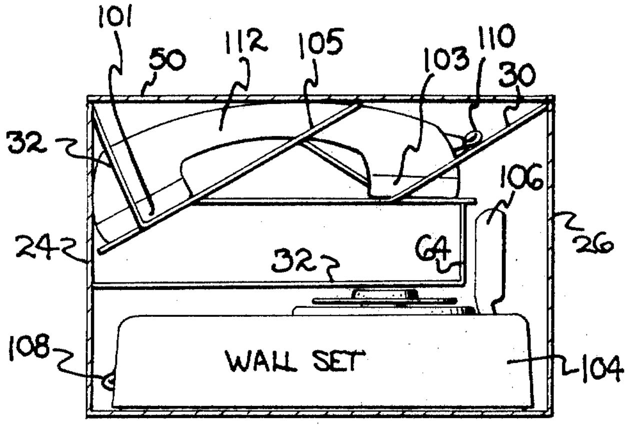
FIG. 8 is a front sectional view of the subject container formed to package a wall set telephone.
Figure 9:
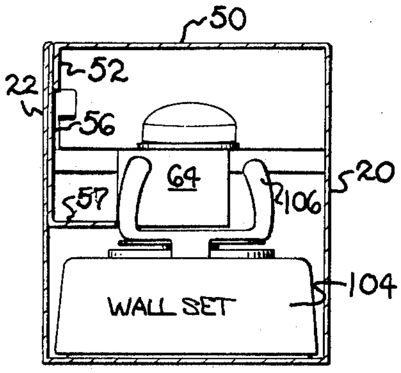
FIG. 9 is an end sectional view of FIG. 8 illustrating the fold of the front insert flap.

To understand how the subject container is adapted to package a wall set telephone, reference should be had to FIGS. 8 and 9. The wall set telephone base 104 is positioned within the container with its handset cradle hook 106 positioned on the right and its connecting line 108 wrapped therearound. The front insert flap 32 is then folded into the container over the wall so that panel 56 is positioned flat against the front panel 22 and panels 57 and 59 extend over the telephone base 104 parallel to the bottom of the container. Tab 64 is then folded up under the cradle hook 106. The right handset supporting flap 30 is then folded in as shown in FIG. 8 such that it rests against the tab 64 and simultaneously the handset cord 110 is positioned in slot 100 at the edge of the flap 30. The left handset supporting flap 28 is then folded into the container and positioned as shown in FIG. 8 such that it rests against the end of flap 30. The wall set handset 112 is then positioned within the container such that its circular ends 101 and 103 are lodged within the arcuate openings 76*a* and 80*a* formed by hinged cutouts 76 and 80 and its central gripping portion 105 resides within the slot 109 formed by hinged cutout 77. As in the other embodiments, the top closing panel 34 is then closed to complete the package.

Thus, it can be seen that from a single paperboard blank, a container can be formed which is adapted to be utilized in the packaging of three different styles of telephones. The versatility and interchangeability of this container significantly reduces the problems involved with packaging and shipping telephones.

Therefore, it should be clear that the subject invention provides a new and novel telephone package which is adapted to contain several different telephone configurations and which is formed from a single folded sheet of corrugated fiberboard to thereby eliminate the problems asociated with utilizing separate types of containers for each type of telephone.

Although but one basic embodiment of this invention has been shown and described in detail, it should be clear to those skilled in the art to which it pertains that many changes and modifications may be made thereto without departing from the scope of this invention.

I claim:

1. A one-piece paperboard blank foldable into a container adapted to package several styles of telephones of the type having a base portion and a separate handset portion comprising: four side wall panels foldably connected together into a tubular configuration, bottom closure flaps hinged to the lower free edges of said side panels and arranged to close the lower end of said tubular configuration, said bottom adapted to serve as a supporting structure for the telephone base portions, a pair of inwardly folded flaps hinged to the upper free edges at opposed side panels of said container in overlying relationship with respect to said telephone base portion, said inwardly fold flaps forming a telephone handset supporting structure wherein said handset is securely held and supported above said telephone base portion, each of said handset supporting flaps further including an arcuate hinged cutout forming an arcuate opening adapted to receive and position the ends of said handset portion, and a top closing panel hinged to the upper free edge of a side panel intermediate of the side panels to which said handset supporting flaps are attached, said top closing panel having a closing tuck flap insertable into said container to secure said top panel in closed relationship to said container, said handset supporting flaps interacting with said top closing panel to securely position the handset against said top closing panel.

2. A one-piece paperboard blank as set forth in claim 1 further including telephone supported means defining the horizontal position of and supporting one of said handset supporting flaps, the other of said handset supporting flaps being folded into overlying relation with respect to and being supported by said one flap.

3. A one-piece paperboard blank foldable into a container adapted to package several styles of telephones of the type having a base portion with front and rear cradle stops and a separate handset portion comprising: four side wall panels foldably connected together into a tubular configuration, bottom closure flaps hinged to the lower free edges of said side panels and arranged to close the lower end of said tubular configuration, said bottom adapted to serve as a supporting structure for the telephone base portions, a pair of inwardly folded flaps hinged to the upper free edges at opposed side panels of said container in overlying relationship with respect to said telephone base portion, said inwardly folded flaps forming a telephone handset supporting structure wherein said handset is securely held and supported above said telephone base portion, each of said handset supporting flaps further including an arcuate hinged cutout forming an arcuate opening adapted to receive and position the ends of said handset portion, a top closing panel hinged to the upper free edge of a side panel intermediate of the side panels to which said handset supporting flaps are attached, said top closing panel having a closing tuck flap insertable into said container to secure said top panel in closed relationship to said container, said handset supporting flaps interacting with said top closing panel to securely hold the handset against said top closing panel, and a front insert flap hinged to the upper free edge of the side panel opposite said intermediate panel, said front insert flap being folded into said container so as to be flush against the interior of the side panel to which it is hinged and said bottom.

4. A one-piece paperboard blank as set forth in claim 3 wherein said front insert flap includes a pair of tabs hinged to opposite edges of said flap and foldable thereunder to provide a raised positioning member for said telephone base.

5. A one-piece paperboard blank as set forth in claim 4 wherein each of said handset supporting flaps includes a pair of hinged cutouts forming small openings which are adapted to snap over said front and rear stop portions on said telephone.

6. A one-piece paperboard blank as set forth in claim 5 wherein one of said handset supporting flaps further includes a large, hinged cutout forming a slot in the free end of said flap which is adapted to receive and support the central holding portion of said telephone handset.

7. A one-piece paperboard blank foldable into a container adapted to package several styles of telephones of the type having a base portion with a cradle hook extending therefrom and a separate handset portion comprising: four side wall panels foldably connected together into a tubular configuration. bottom closure flaps hinged to the lower free edges of said side panels and arranged to close the lower end of said tubular configuration, said bottom adapted to serve as a supporting structure for the telephone base portions, a pair of inwardly folded flaps hinged to the upper free edges at opposed side panels of said container in overlying relationship with respect to said telephone base portion, said inwardly folded flaps forming a telephone handset supporting structure wherein said handset is securely held and supported above said telephone base portion, each of said handset supporting flaps further including an arcuate hinged cutout forming an arcuate opening adapted to receive and position the ends of said handset portion, a top closing panel hinged to the upper free edge of a side panel intermediate of the side panels to which said handset supporting flaps are attached, said top closing panel having a closing tuck flaps insertable into said container to secure said top panel in closed relationship to said container, said handset supporting flaps interacting with said top closing panel to securely position the handset against said top closing panel, and a front insert flap hinged to the upper free edge of the side panel opposite said intermediate panel, said front insert flap including a tab hinged to an edge of said flap and being foldable into said container in overlying relationship with said telephone base so that said tab is folded upright adjacent to said cradle hook to provide a support for one of said handset supporting flaps.

8. A one-piece paperboard blank as set forth in claim 7 wherein one of said handset supporting flaps further includes a large, hinged cutout forming a slot in the free end of said flap which is adapted to receive and support the central holding portion of said telephone handset.

References Cited

UNITED STATES PATENTS

| | | | |
|---|---|---|---|
| 2,134,375 | 10/1938 | Price et al. | 206—46 |
| 2,578,107 | 12/1951 | Thacker et al. | 206—46 |
| 2,747,732 | 5/1956 | Fischer | 229—38 |
| 3,138,247 | 6/1964 | Perry | 206—46 |
| 3,326,362 | 6/1967 | Smith et al. | 206—46 |

WILLIAM T. DIXSON, Jr., Primary Examiner

U.S. Cl. X.R.

229—14

PO-1050
(5/69)

UNITED STATES PATENT OFFICE
CERTIFICATE OF CORRECTION

Patent No. 3,500,997 Dated March 17, 1970

Inventor(s) Edgar A. Swift

It is certified that error appears in the above-identified patent and that said Letters Patent are hereby corrected as shown below:

Column 3, line 45 "byt controls" should be -- by cutouts--. Column 3, line 45 "steps" should be --stops--. Column 3, line 54 "arculate" should be --arcuate--. Column 4, line 6 "109" should be --79--. Column 6, line 12 "flaps" should be --flap--.

SIGNED AND
SEALED
AUG 11 1970

(SEAL)
Attest:

Edward M. Fletcher, Jr.
Attesting Officer

WILLIAM E. SCHUYLER, JR.
Commissioner of Patents